(12) United States Patent
Mangé et al.

(10) Patent No.: US 7,513,213 B2
(45) Date of Patent: Apr. 7, 2009

(54) METHOD, APPARATUS, AND SYSTEM FOR COATING FOOD ITEMS

(75) Inventors: Christian Mangé, Dublin, OH (US); Jared Vandemark, Columbus, OH (US)

(73) Assignee: Nestec S.A., Vevey (CH)

( * ) Notice: Subject to any disclaimer, the term of this patent is extended or adjusted under 35 U.S.C. 154(b) by 797 days.

(21) Appl. No.: 10/974,916

(22) Filed: Oct. 28, 2004

(65) Prior Publication Data
US 2006/0090654 A1    May 4, 2006

(51) Int. Cl.
*B05C 5/02* (2006.01)
*B05C 11/11* (2006.01)

(52) U.S. Cl. .............................. 118/31; 118/13; 118/16; 118/24; 118/600; 118/602; 118/313; 118/501

(58) Field of Classification Search .................... 118/13, 118/24, 31, 600, 602, 313, 500, 501, DIG. 3, 118/16; 426/101; 427/422, 317; 206/485, 206/485.1, 588, 589, 562, 563, 518; 211/85.4; 248/311.2; 99/495
See application file for complete search history.

(56) References Cited

U.S. PATENT DOCUMENTS

| | | | | |
|---|---|---|---|---|
| 2,282,661 A | * | 5/1942 | Lewis .......................... | 118/502 |
| 2,344,937 A | * | 3/1944 | Brazier ........................ | 206/562 |
| 4,390,553 A | * | 6/1983 | Rubenstein et al. .......... | 426/138 |
| 5,322,432 A | * | 6/1994 | Gilje ............................ | 425/91 |
| 5,415,534 A | * | 5/1995 | Bertrand et al. ............. | 425/104 |
| 5,882,253 A | * | 3/1999 | Mostoller .................... | 452/173 |

FOREIGN PATENT DOCUMENTS

WO    WO 03/000064 A1    1/2003

* cited by examiner

*Primary Examiner*—Laura Edwards
(74) *Attorney, Agent, or Firm*—Joachim T. Fritz; Borden Ladner Gervais LLP

(57) ABSTRACT

A method, apparatus, and system for coating food items such as coating empty ice cream cones subsequently containing ice cream. A liquid recovery apparatus is used in the method, apparatus, and system and is fashioned in a tray-like manner to form a slideway that includes a bottom section with openings that have collars along with opposing sidewalls and endwalls that together enable containment of coating liquid such as a chocolate coating. The chocolate coating is recovered and thereby reused as a subsequent topping for the filled ice cream cone.

14 Claims, 4 Drawing Sheets

METHOD, APPARATUS, AND SYSTEM FOR COATING FOOD ITEMS

FIELD OF THE INVENTION

The present invention relates generally to a method, apparatus, and system for coating food items. More particularly, the present invention relates to a mask apparatus and method of using the mask apparatus within a system for the coating of food items capable of containing liquid-based confections including, but not limited to, empty ice cream cones subsequently filled with ice cream.

BACKGROUND OF THE INVENTION

In the field of dry-goods production, an ever-present problem related to humidity exists. The shelf life of any given dry-good is lessened by the absorption of water from adjacent moist materials, such as ice cream as a source of water within an ice cream cone product. This concern is no less than an issue in the production of ice cream products that include dry wafer containers in the common form of cones. Such cones are usually intended to be an edible part of the ice cream product. Ideally, such cones maintain their desirable attributes such as crispiness and flavour. However, the high relative humidity of ice cream detracts from such desirable attributes over time. This is due, in large part, from the migration of moisture from the ice cream into the cone itself. This results in undesirable effects such as reduced crispiness in the cone. Indeed, a soggy cone tends to absorb flavours from its surrounding environment resulting in a taste that may be more like the freezer compartment or cardboard packaging.

In order to overcome the undesirable effects of moisture migrating from a relatively moist ice cream material into a relatively dry cone, the frozen confection industry has provided a coating layer between the cone and ice cream to prevent migration of such moisture. The standard coating layer that has been used by the industry is a chocolate product that is vegetable oil based and thus provides a relatively water-impermeable moisture barrier. In manufacture of the ice cream product, the cone is coated by some form of spray applied to the interior of the cone prior to introduction of the ice cream in order to maintain the crispiness of the cone.

One critical point in contact with the ice cream is the rim of the cone. Even the relatively small area of the rim being exposed to ice cream can result in detrimental moisture increases within the entire wafer cone. For an unlived wafer sprayed in an upright position, the protection of the rim must be done by an over-spray. Commonly, a cardboard tray is currently used to carry the wafers on assembly lines. This cardboard tray serves at the same time to collect any over spray. In addition to significant wastage of the coating itself in terms of cost, such overspray represents potential cleanliness problems in regards to the assembly line as well as waste-disposal concerns related to the soiled cardboard trays.

While the problems elucidated herein are related to ice cream and wafer cones that are used to hold such ice cream, it is equally apparent that any spray coating applied to a dry-good designed to hold a relatively moist food product would incur the same problems. Such other problematic food products may therefore not be limited to frozen ice cream cones, but may include snack items such as filled pie crusts intended to have an improved shelf life in terms of crispiness and flavour.

It is, therefore, desirable to provide a manner and mechanism of coating food items that alleviates problems associated with overspray.

SUMMARY OF THE INVENTION

It is an object of the present invention to obviate or mitigate at least one disadvantage of previous methods and apparatus for coating food items such as, but not limited to, ice cream cones intended for extended shelf life.

In a first aspect, the present invention provides a liquid recovery apparatus for use in coating food items, said apparatus comprising: a bottom section having at least one opening, each said opening including a collar; a first sidewall arranged perpendicular to said bottom section; a second sidewall arranged perpendicular to said bottom section and parallel to said first sidewall; a first endwall arranged perpendicular to each of said first and said second sidewalls and said bottom section; a second endwall arranged perpendicular to each of said first and said second sidewalls and said bottom section and parallel to said first endwall; a recovery means for recovering coating liquid, said recovery means located nearer said first endwall; and wherein said bottom section, said first sidewall, said second sidewall, said first endwall, and said second endwall enable containment of coating liquid therein for recovery by said recovery means.

In a further embodiment, there is provided a method of coating a food item with a coating liquid including recovery of said coating liquid via a liquid recovery apparatus including a bottom section having at least one opening, each said opening including a collar, a first sidewall arranged perpendicular to said bottom section, a second sidewall arranged perpendicular to said bottom section and parallel to said first sidewall, a first endwall arranged perpendicular to each of said first and said second sidewalls and said bottom section, a second endwall arranged perpendicular to each of said first and said second sidewalls and said bottom section and parallel to said first endwall, and a recovery means for recovering coating liquid, said recovery means located nearer said first endwall, said method comprising: presenting one or more food items in a stationary position below said liquid recovery apparatus; lowering said liquid recovery apparatus such that each said collar surrounds a corresponding one of each said food item; spraying a coating liquid from above each said collar in order to coat each said food item such that each said food item is coated with said coating liquid and excess coating liquid sprayed outside of a periphery of said collar collects in said bottom section of said liquid recovery apparatus; raising said liquid recovery apparatus such that said excess coating liquid flows towards said first endwall; and collecting said excess coating liquid via said recovery means such that said excess coating liquid is available for reuse.

In still a further embodiment, there is provided a system for manufacturing a coated food product, said system comprising: a holding mechanism for moving one or more food items into a fixed position; a first spraying mechanism for coating each of said one or more food items; a liquid recovery apparatus including a bottom section having at least one opening, each said opening including a collar engageable with each of said one or more food items, a first sidewall arranged perpendicular to said bottom section, a second sidewall arranged perpendicular to said bottom section and parallel to said first sidewall, a first endwall arranged perpendicular to each of said first and said second sidewalls and said bottom section, a second endwall arranged perpendicular to each of said first and said second sidewalls and said bottom section and parallel to said first endwall, and a suction device for recovering excess coating liquid collected within a space defined by said bottom section, said first sidewall, said second sidewall, said first endwall, and said second endwall, said suction device located nearer said first endwall; a pump mechanism operably connected to said suction device for evacuating said excess coating liquid; a reservoir for holding said excess coating liquid; a means for filling each of said one or more food items with an edible confection to form a food product; and a second spraying mechanism fed from said reservoir for providing further deposits of said excess coating liquid on said food product.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached figures, wherein.

DETAILED DESCRIPTION

Generally, the present invention provides a method and apparatus for coating food items by way of a mask apparatus that limits wasted coating material. While not intended to be limiting, the present invention is described in terms of coating the interior surfaces of wafer cones designed to hold ice cream. Accordingly, it should be understood that the present method and apparatus for coating may be applied to a variety of dry food items capable of containing liquid-based or otherwise moist confections without straying from the intended scope of the present invention. Such may include, without limitation, snack cakes having pie shells, fruit-based frozen confections having rice or grain-based edible containers, and cream-filled baked goods.

In the preferred embodiment of the present invention, the method and apparatus provides coating of the interior of a wafer cone. Moreover, such method and apparatus enable overspray of the wafer cone in order to assure uniform and thick coating of the rim of the wafer cone.

Figure 1:
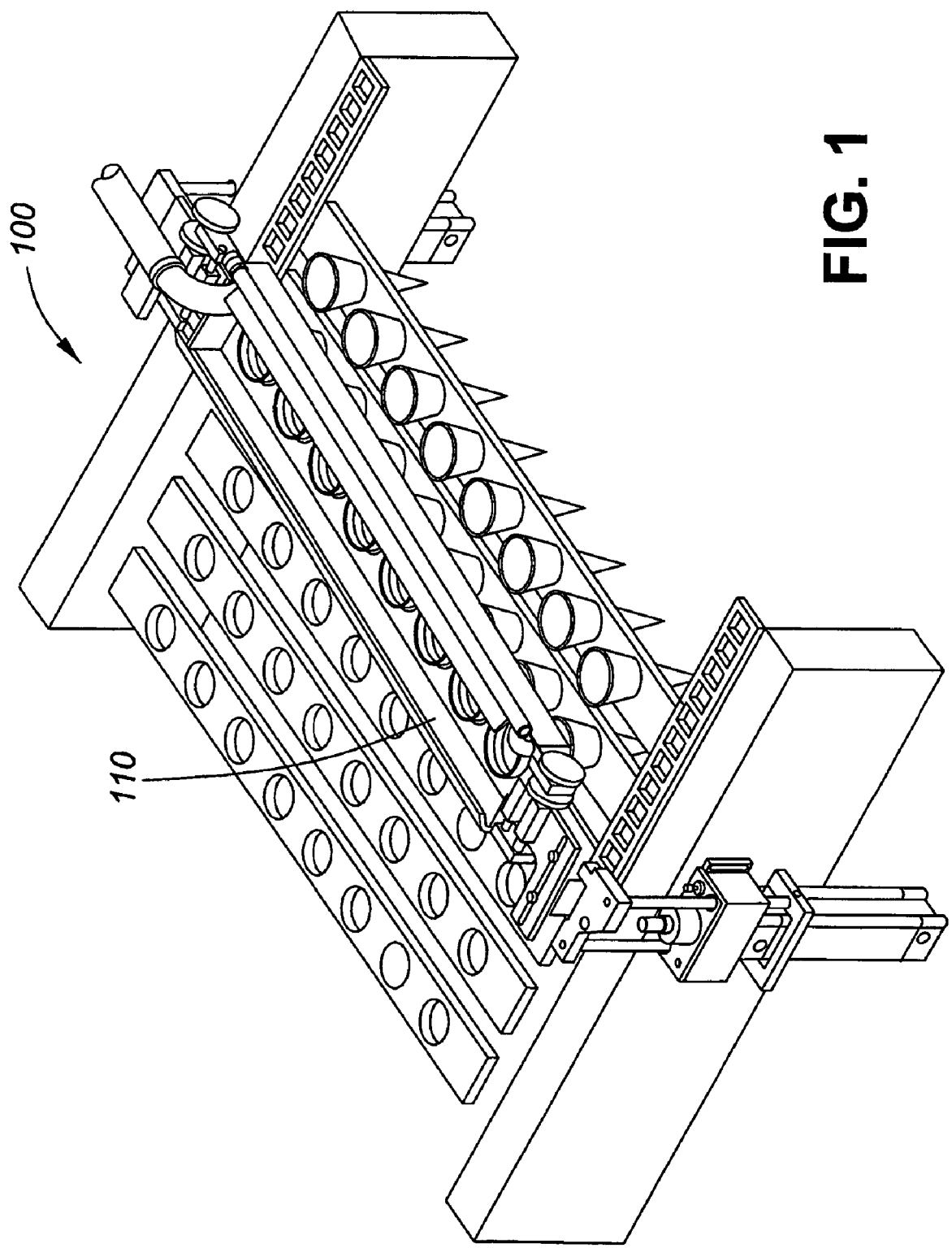
FIG. 1 is a perspective view of the present invention in accordance with the preferred embodiment.

With reference to FIG. 1, the present invention is shown in the context of a precoating portion 100 of a full ice cream cone assembly line (not shown). Within precoating portion 100 of the assembly line, a tray-like device is provided in the form of a mask apparatus 110. The mask 110 is formed from a durable material. Stainless steel is preferred due to the necessary sanitary conditions and requisite cleaning related to food production. In the preferred embodiment, the mask is formed by at least one double-jacketed wall. The double jacketing is for the purpose of providing circulation of a warming medium, such as warm water, within the mask 110. The warming medium transmits heat into the stainless-steel walls. The necessity of this will become apparent with further description discussed further herein.

Figure 1A:
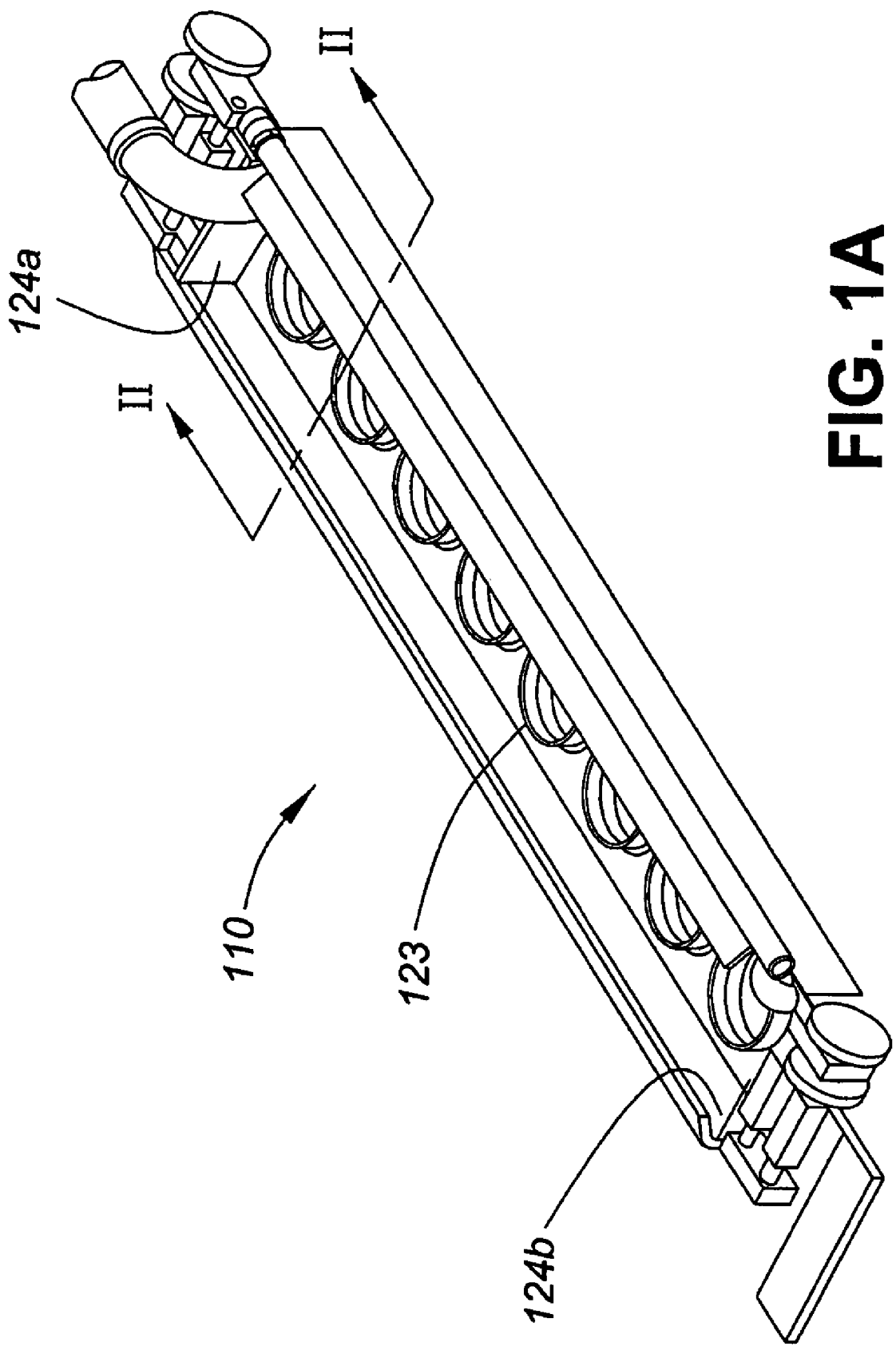
FIG. 1A is a perspective view of a mask in accordance with the present invention shown in the preferred embodiment of FIG. 1.
Figure 2:
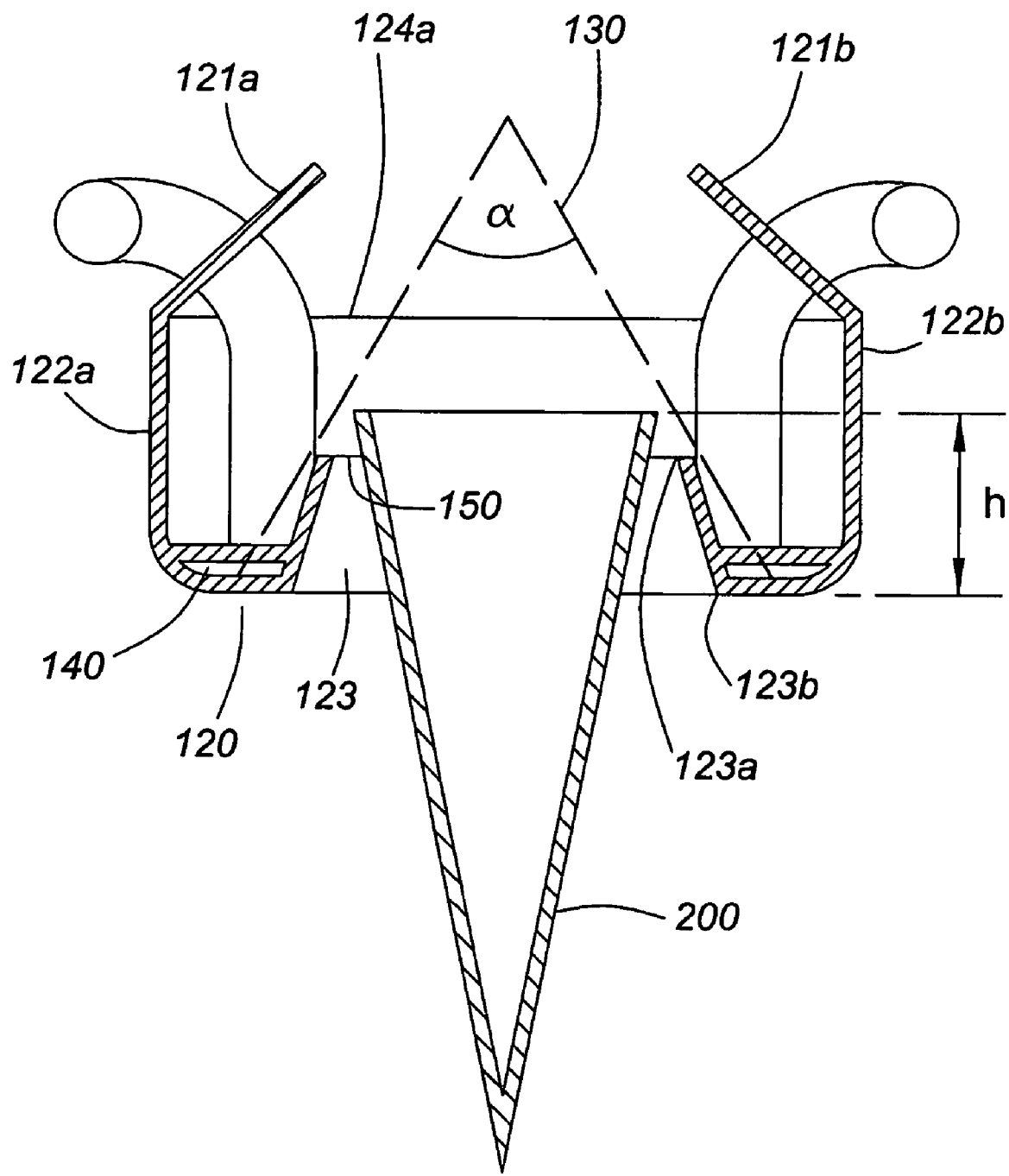
FIG. 2 is a cross-sectional view showing the mask and a wafer cone in accordance with the preferred embodiment of FIG. 1.

With further reference to FIGS. 1A and 2, the mask 110 itself is formed as an elongated chute or slideway including a bottom section 120, sidewalls 122a, 122b with splashguards 121a, 121b endwalls 124a, 124b, and. FIG. 2 is a cut-away view taken across line 11-11 in FIG. 1A. The bottom 120 includes at least one conical opening 123. Each conical opening 123 is a truncated, hollow cone-shaped collar with an upper circumference 123a and a lower circumference 123b. The conical opening 123a functions as a feedthrough for each empty ice cream cone 200. The upper circumference 123a being dimensioned slightly larger than the widest circumference of the empty ice cream cone 200. The conical opening may be additional pieces, or inserts, that are clipped into the mask from the bottom to the top. Such inserts would therefore be removable/replaceable and may be fabricated from a durable polymer or any suitable material that will give the advantage to be easily adapted if the wafer diameter has been changed. While eight conical openings 123 are shown in FIG. 1, it should be noted that any number of such openings may exist for the given application—e.g., pre-coating of multiple wafer cones. The splashguards 121a, 121b are angled extensions of sides 122a, 122b, respectively.

A spray means (not shown) produces a generally solid conical area of spray illustrated as the coating spray 130 in FIG. 2. Any suitable spray means for providing a cone of spray of the given coating material can be used in accordance with the present invention. However, the coating spray 130 has a preferred spray angle α that is in a range of between 20 degrees and 50 degrees and centered on the longitudinal axis of each cone 200. Each conical opening 123 in conjunction with the adjacent exposed inner surfaces of the bottom section 120, sidewalls 122a, 122b, endwalls 124a, 124b, and splashguards 121a, 121b serve to capture most, if not all, of the excess coating (i.e., overspray) deposited by the coating spray 130 on each cone's inner surface and rim. In the preferred embodiment which pertains to chocolate coating the inner surface and top circumferential rim of a wafer cone, the spray coating will tend to solidify. Accordingly, heating of the mask 110 will assist in maintaining the spray coating in a liquefied state.

In a preferred embodiment, heating of the mask 110 is accomplished as mentioned above via hot water where the bottom section 120 is formed by a double-walled structure 140 as shown in FIG. 2 that allows sealed hot water to flow therein. The specifics of hot water pumps and related tubing and heating elements that provide such hot water are not described or shown as these are features well within the knowledge of ordinary skill in the art. However, it should further be understood that various other mechanisms may be utilized in order to heat the mask 110 to a desired temperature such as, but not limited to, resistance heating applied to the outer surfaces of the mask 110, integrated inductance heating mechanisms, or elevated ambient temperatures by way of air heaters or by pre-coating in a heated chamber.

Each conical opening 123 is designed to avoid breakage of the wafer cones and to collect the maximum amount of coating overspray. Each conical opening 123 is preferably formed by a thin-walled, conical plastic ring. It is well within the intended scope of the present invention to fabricate such plastic rings in such a way that they are replaceable in differing sizes for cones of differing sizes or replaceable for maintenance reasons related to normal wear and tear. While this would require a disruption and servicing of the ice cream cone assembly line, only such plastic rings would require replacement. Still further, the conical opening 123 may be provided as an integral part of the bottom 120 and thereby formed from stainless steel.

As mentioned above, the upper circumference 123a of the conical opening 123 is sized to be slightly larger than the largest circumference (i.e., top rim) of the cone 200. This results in a spacing 150 between the inner edge of the upper circumference 123*a* and the rim of the cone 200. Such spacing 150 will allow some room for lateral displacement of each cone 200 that may normally occur during movement of the assembly line. The spacing also thereby minimizes physical contact with the cone 200 by the mask 110 such that the opportunity for wafer breakage is reduced. Further, in order to prevent or otherwise minimize the amount of chocolate coating going through the gap formed by such spacing 150, two variables should be preferably set. First, the rim of the cone 200 should be located at a minimum distance above the underside of the bottom section 120 of the mask 110. This minimum distance shall be termed "wafer rise" for purposes of this application and indicated by "h" in FIG. 2. The wafer rise should be a minimum of one inch, and more preferably, two inches. For this purpose, it would be within the scope of the present invention to include a means that could lift the wafer through its conical opening so as to rise it at the optimum position "h". Secondly, the angle α at which the chocolate spray is dispatched from above should be not smaller than 20°, and preferably 50°.

Figure 3:
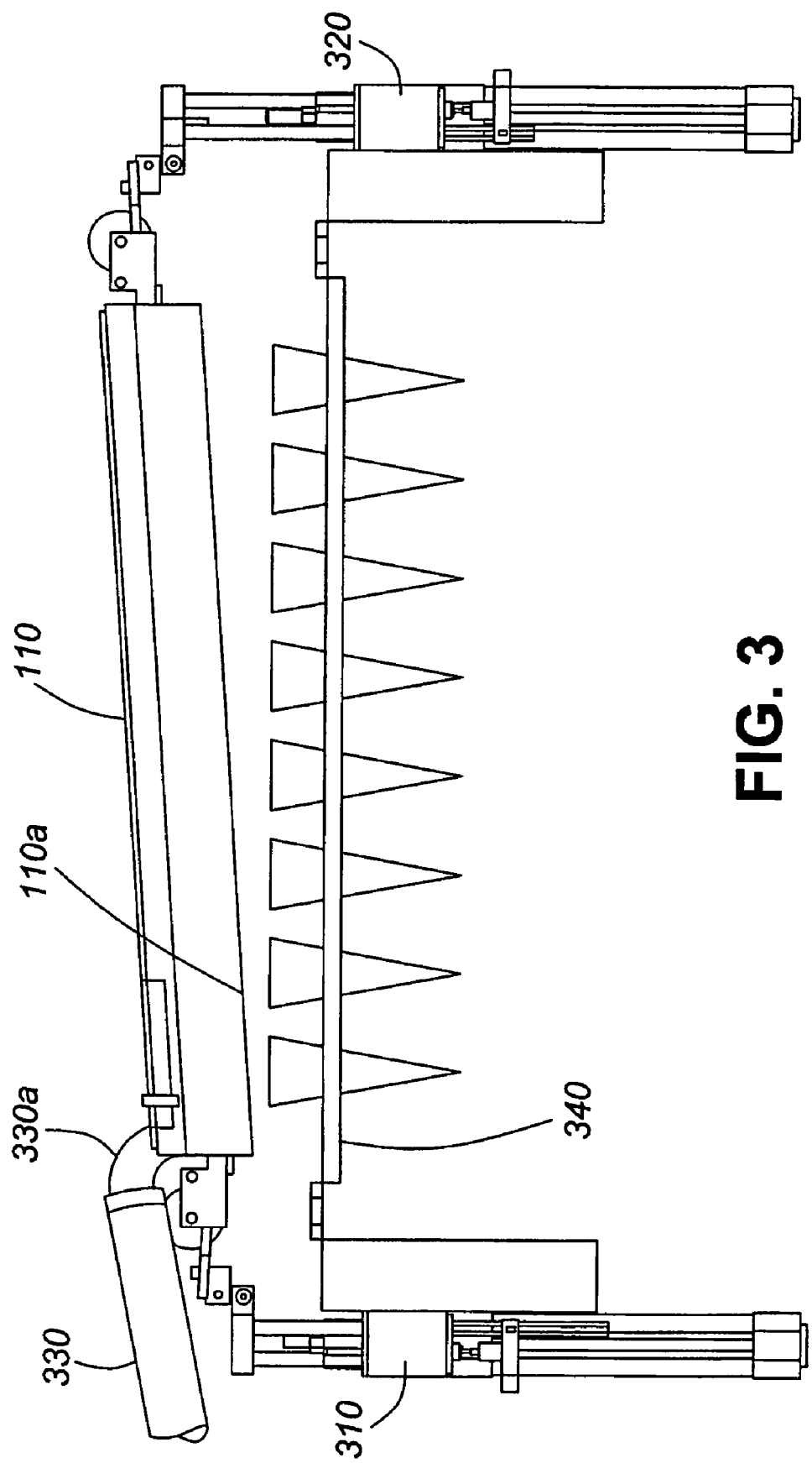
FIG. 3 is an end view of the present invention in accordance with the preferred embodiment of FIG. 1.

In operation just at the spray position, the mask 110 is placed such that each conical opening 123 rests around the cone 200 in the region of the wafer rise. In this position, the mask 110 is laid on the cone carrier of the assembly line during the spraying of the rim in order to collect the overspray. In normal operation, wafer cones are known to flake or otherwise break such that some wafer scraps are also collected by the mask 110 and mixed with the chocolate coating. Such coating overspray and wafer scraps thereby collect in the bottom section 120 of the mask 110. After a row of cones is sprayed in accordance with the preferred embodiment, the mask 110 will be lifted, as shown in FIG. 3, on one end to allow the sprayed cones to move along and be replaced by another row of empty cones for the next spray. Lifting occurs via actuators 310, 320 located at the ends of the mask 110. The mask 110 itself is lifted up when the carrier is moving forward. During the lift, one end of the mask 110 rotates about a fixed point while the other end travels along an arcuate path. Thus, the mask 110 is sloped to form a slideway that allows the excess coating (with or without wafer scraps) to flow towards the lower end where such excess coating is then pumped out of the mask 110 via recovery means 330 that includes any type of suitable suction pump and reservoir. For purposes of clarity, the pump and reservoir have been omitted from the description as details of any suitable pump or reservoir would be clear to one of ordinary skill in the art.

With further reference to FIG. 3, a recess or gathering area for the excess coating may be provided at the lower end 110*a* of the mask 110. Also, channels may be provided in the surface of the bottom 120 to assist gathering and flow of the excess coating to the lower end during the rise position. Due to the fact that the excess coating may include fairly sizeable particles of wafer from the cones, the egress pipe 330*a* that removes the excess coating from the recess or gathering area should be at least ½" in diameter.

The present invention as described above is useful within assembly line systems that use chocolate coating in multiple areas of the assembly line. That it to say, the present invention provides for a method of coating a wafer cone where excess coating collected during the precoating of empty cones can be recirculated to subsequent filling steps. Specifically, the excess coating may be used within a step after the cones are filled with ice cream to provide a topping of chocolate coating on the ice cream. Subsequent introduction of nuts, cookie crumble, or other such similar topping may then be provided to adhere to the chocolate topping. Accordingly, a substantial savings is realized in the manufacture of ice cream cones by recirculating excess coating that is recovered from the precoating step via the present inventive apparatus.

It should be understood that the embodiment shown and described is illustrative of only one embodiment of the present invention and should not be construed as limiting. While the wafer cone as shown is resting on a lamella 340, an alternative that is well within the scope of the present invention would be to provide each wafer cone in a respective holder (not shown). Such a holder could allow the wafer to sit higher with an increased wafer rise. This would reduce the need for a conical opening 123 and instead allow use of a cylindrical opening (not shown) in the base section 120.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A liquid recovery apparatus for use in coating food items, said apparatus comprising:
   a bottom section having at least one opening, each said opening including a collar;
   a first sidewall arranged perpendicular to said bottom section;
   a second sidewall arranged perpendicular to said bottom section and parallel to said first sidewall;
   a first endwall arranged perpendicular to each of said first and said second sidewalls and said bottom section;
   a second endwall arranged perpendicular to each of said first and said second sidewalls and said bottom section and parallel to said first endwall;
   a recovery means for recovering coating liquid, said recovery means located nearer said first endwall;
   wherein said bottom section, said first sidewall, said second sidewall, said first endwall, and said second endwall enable containment of coating liquid therein for recovery by said recovery means and
   wherein said bottom section includes a hollow cavity for circulation of a heating medium which warms said apparatus.

2. The apparatus as claimed in claim 1, wherein each said collar is formed by a truncated cone with a larger circumferential opening of said truncated cone occurring adjacent said bottom section and a smaller circumferential opening of said truncated cone occurring a predetermined distance from said bottom section.

3. The apparatus as claimed in claim 1, wherein each said collar is formed separate from said bottom section such that each said collar forms an insert that is removeably fixable and adaptable to receive a food item of varying size.

4. The apparatus as claimed in claim 2, wherein said predetermined distance enables a food item no wider than said smaller circumferential opening to be inserted within each said collar and thereby rise at least one inch into said apparatus.

5. The apparatus as claimed in claim 1, wherein each said collar is formed from food-grade plastic and said bottom section, said first sidewall, said second sidewall, said first endwall, and said second endwall are formed from stainless steel.

6. The apparatus as claimed in claim 5, wherein each said collar is removable.

7. The apparatus as claimed in claim 1, wherein said apparatus further includes a recessed area located adjacent said first endwall for pooling coating liquid.

8. The apparatus as claimed in claim 7, wherein said recovery means includes a suction device for evacuating said recessed area of any pooled coating liquid.

9. The apparatus as claimed in claim 8, wherein said apparatus is movable along an arc formed about a pivot point located adjacent said first endwall so as to facilitate movement of coating liquid towards said recessed area by forces of gravity.

10. A system for manufacturing a coated food product, said system comprising:
   a holding mechanism for moving one or more food items into a fixed position;
   a first spraying mechanism for coating each of said one or more food items;
   a liquid recovery apparatus including a bottom section having at least one opening, each said opening including a collar engageable with each of said one or more food items, a first sidewall arranged perpendicular to said bottom section, a second sidewall arranged perpendicular to said bottom section and parallel to said first sidewall, a first endwall arranged perpendicular to each of said first and said second sidewalls and said bottom section, a second endwall arranged perpendicular to each of said first and said second sidewalls and said bottom section and parallel to said first endwall, and a suction device for recovering excess coating liquid collected within a space defined by said bottom section, said first sidewall, said second sidewall, said first endwall, and said second endwall, said suction device located nearer said first endwall;
   a pump mechanism operably connected to said suction device for evacuating said excess coating liquid;
   a reservoir for holding said excess coating liquid;
   a means for filling each of said one or more food items with an edible confection to form a food product; and
   a second spraying mechanism fed from said reservoir for providing further deposits of said excess coating liquid on said food product.

11. The system as claimed in claim 10 wherein said coated food product is an ice cream cone and each said one or more food item is an unfilled wafer cone.

12. The system as claimed in claim 11 wherein said coating liquid is water-impermeable and edible and said excess coating liquid contains particles of said unfilled wafer cone in addition to said coating liquid.

13. The system as claimed in claim 12 wherein said coating liquid forms a uniform deposit on a rim and interior of said unfilled wafer cone and said excess liquid coating forms a topping layer upon said ice cream cone.

14. The system as claimed in claim 13 wherein said first spraying mechanism includes a spray angle in a range of between 20 and 50 degrees centered on said unfilled wafer cone and each said opening allows a wafer rise in a range between 1 and 2 inches.

* * * * *